United States Patent [19]

Omachi

[11] 3,837,916

[45] Sept. 24, 1974

[54] METHOD FOR PREVENTING LIVING THINGS SUCH AS MICROORGANISMS IN THE SEA FROM STICKING TO SUBMARINE EQUIPMENT BY SPRAYING WITH FRESH WATER

[76] Inventor: Toshio Omachi, No. 26-6, Oi 5-chome, Tokyo, Japan

[22] Filed: Sept. 25, 1972

[21] Appl. No.: 292,101

[52] U.S. Cl................ 134/34, 114/66, 114/222, 134/42
[51] Int. Cl.................... B08b 3/04, B63b 59/00
[58] Field of Search .......... 134/34, 42; 114/66, 222

[56] References Cited
UNITED STATES PATENTS

| | | | |
|---|---|---|---|
| 3,276,841 | 10/1966 | Philip et al................ | 134/34 X |
| 3,441,439 | 4/1969 | Eagell....................... | 134/34 X |
| 3,707,737 | 1/1973 | Brower..................... | 114/222 X |
| 3,773,059 | 11/1973 | Arneson.................... | 114/222 X |

Primary Examiner—S. Leon Bashore
Assistant Examiner—Richard H. Tushin
Attorney, Agent, or Firm—Otto John Munz

[57] ABSTRACT

Living things such as microorganisms in the sea water are kept from sticking or adhering to submerged outer surfaces such as transparent windows of submarine equipment such as submarine houses, submarine boats and tanks in the deep-sea as well as submarine illuminating devices of the windows so as to maintain proper transparency of the windows. The method comprises the step of supplying fresh water onto the surface of the transparent window exposed to the sea water so as to cause the continuous or intermittent flow of the fresh water over the surface in contact therewith thereby permitting the smell of fresh water to be maintained on the surface of the window exposed to the sea water. Since living things and microorganisms in the sea water dislike the smell of fresh water, the living things will not stick to or will leave the surface of the transparent window even though they stick thereto thereby permitting the transparent window to maintain proper transparency thereof.

8 Claims, 5 Drawing Figures

METHOD FOR PREVENTING LIVING THINGS SUCH AS MICROORGANISMS IN THE SEA FROM STICKING TO SUBMARINE EQUIPMENT BY SPRAYING WITH FRESH WATER

BACKGROUND OF THE INVENTION

The present invention relates to a method for preventing living things such as microorganisms in the sea water from sticking or adhering to transparent windows in submarine equipments such as submarine houses, submarine boats and tanks in the deep-sea and submarine illuminating devices to be used therewith so as to maintain the proper transparency of the transparent windows.

Recently, exploitation in the sea bottom or submarine development has been widely proceeded and submarine equipments such as submarine houses, submarine boats and tanks in the deep-sea and submarine illuminating devices have been increasingly required which can stay in the sea for a long time. The transparency of the transparent windows provided in the equipments for the observation and/or the illumination of the objects in the sea tends to be deteriorated during the time they are used in the sea for a long time due to the sticking or adhesion of living things such as microorganisms in the sea onto the surface of these windows exposed to the sea water, thereby tending to obstruct the observation and the illumination of the object in the sea.

In order to remove the living things or the microorganisms sticking onto the surface of the transparent windows, many devices must be employed for manually removing them so that a considerable expense and a great deal of labor are required. The present invention aims at avoiding the disadvantages heretofore unavoidable in cleaning the transparent windows of the submarine equipments.

SUMMARY OF THE INVENTION

The object of the present invention is to provide a novel and useful method for preventing living things such as microorganisms in the sea water from sticking to transparent windows of submarine equipments for observation and/or illumination of the objects in the sea.

The basic technical thought of the present invention lies in the fact that living things such as microorganisms in the sea water extremely dislike the smell of fresh water or have a substantial distaste for the smell of fresh water and sticking or adhesion of the living things and the microorganisms in the sea water onto the surface of the transparent windows of the submarine equipments exposed to the sea water can be avoided by applying the smell of fresh water to the surface of the windows contacting with the sea water.

To this end, fresh water is continuously or intermittently supplied to the surface of the transparent windows contacting with the sea water to cause the flow of fresh water along and in contact with the entire surface of the transparent windows so that the smell of the fresh water is maintained on the surface of the transparent windows. Thus, the living things and the microorganisms coming into contact with the surface of the windows in which the smell of fresh water is maintained tend to leave the surface so that the proper transparency of the windows can be kept for a long time, thereby making it unnecessary to employ divers to clean the transparent windows.

DETAILED DESCRIPTION OF THE PREFERRED EMBODIMENTS

Figure 1:
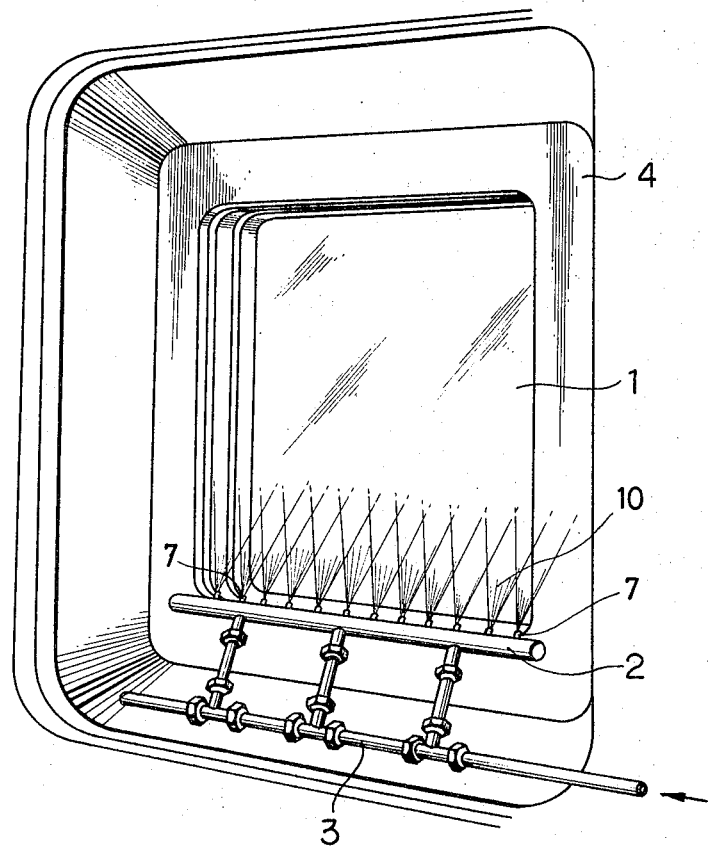
FIG. 1 is a fragmentary perspective view showing a transparent window of a submarine house to which the device for carrying out the method in accordance with the present invention is applied.

FIG. 1 shows a transparent observation window of a submarine house of pressure resisting construction used in the deep sea. The window comprises a pressure resisting transparent glass plate 1 and a window frame 4 water-tightly securing the glass plate 1 to the wall of the submarine house.

In accordance with the characteristic feature of the present invention, a nozzle pipe 2 housing a plurality of water ejecting holes 7 in the peripheral wall thereof is supported outside the frame 4 adjacent to the lower side thereof in parallel relationship thereto by a plurality of branch pipes with their one ends connected to the nozzle pipe 2 and their other ends connected to a water supply pipe 3 which is provided in the submarine house for supplying fresh water 10 from a fresh water supplying source (not shown) provided in the submarine house to the nozzle pipe 2 so as to eject the fresh water 10 through the ejecting holes 7.

The fresh water 10 may be supplied and ejected through the holes 7 continuously or intermittently.

When the fresh water 10 is ejected through the ejecting holes 7, the fresh water 10 flows along the outer surface of the transparent glass 1 upwardly in contact therewith by virtue of the difference in the specific gravity between the fresh water and the sea water and then mixes with the sea water. Thus, the smell of the fresh water 10 is maintained on the outer surface of the transparent glass 1. As described previously, since living things such as microorganisms in the sea water have a substantial distaste for the smell of the fresh water or dislike the smell of the fresh water, they will not stick or adhere to the outer surface of the transparent glass 1 having the smell of the fresh water thereon or will leave the outer surface even though they once stick thereto.

In case the fresh water is applied to the outer surface of the glass 1 intermittently, the smell of the fresh water may disappear from the outer surface and the living things and the microorganisms tend to adhere to the outer surface of the glass 1. However, they will leave the outer surface of the glass 1 when the fresh water 10 is again ejected from the ejecting holes 7 so that the smell of the fresh water is given to the outer surface of the glass 1 thereby positively preventing the living things and the microorganisms from being kept sticking to the outer surface of the glass 1. Therefore, the proper transparency of the transparent glass 1 is maintained and the observation of the object through the window is not obstructed for a long time.

The above device may be incorporated in any submarine equipments other than the submarine house shown, for example, it may be incorporated in submarine boats and tanks and submarine illuminating device.

Figure 2:
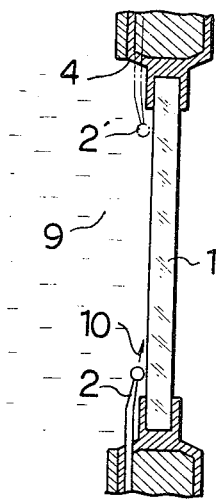
FIG. 2 is a fragmentary sectional view showing a modification of the device for carrying out the present invention.

In case the area of the glass plate 1 is too large to be contacted entirely with the fresh water supplied by a single nozzle pipe 2 as shown in FIG. 1 before it mixes with the sea water 9, additional nozzle pipes may be provided at the upper side of the frame 4 as shown in FIG. 2 and, further, at the left and right sides of the frame 4 so as to supply the fresh water all over the entire surface of the transparent glass 1 in contact therewith before the fresh water mixes with the sea water 9.

Figure 3:
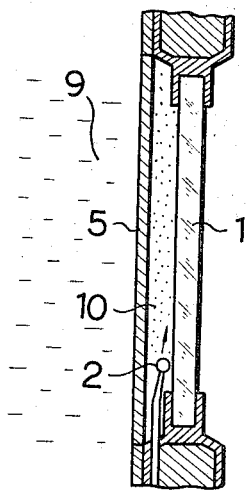
FIG. 3 is a fragmentary sectional view similar to FIG. 2 but showing another modification of the device for carrying out the present invention.

FIG. 3 shows another embodiment of the device for carrying out the present invention. In this case, a shutter 5 normally opened but capable of being temporarily closed so as to form a space between the shutter 5, the frame 4 and the transparent glass plate 1 for filling fresh water 10 is provided at the outside of the frame 4. When the glass 1 begins to be contaminated by living things and microorganisms sticking to the outer surface of the glass plate 1, the shutter 5 is temporarily closed and the fresh water 10 is introduced into the space defined by the shutter 5, the frame 4 and the glass plate 1 through nozzle pipe 2. Thus, the living things and the microorganisms having a substantial distaste for the smell of the fresh water leave the glass plate 1 thereby permitting very efficient cleaning of the transparent glass plate 1 to be effected.

Figure 4:
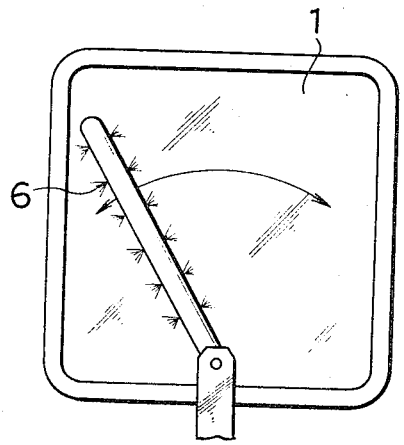
FIG. 4 is a fragmentary front view showing a further modification of the device for carrying out the present invention.

FIG. 4 shows a further embodiment of the device for carrying out the present invention. In this case, the nozzle pipe 6 is swingably pivoted at its proximal end to the fresh water supply pipe so that the nozzle pipe 6 is swung along the outer surface of the transparent glass plate 1 in parallel relation adjacent thereto. Thus, the fresh water issuing through the ejecting holes of the nozzle pipe 6 sweeps all over the glass plate 1 thereby effecting efficient cleaning of the glass plate 1.

Figure 5:
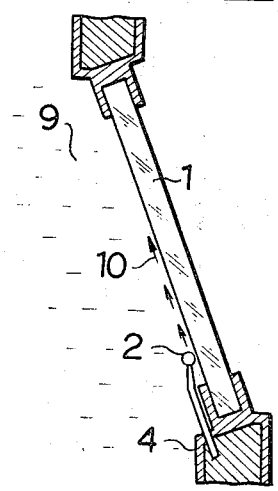
FIG. 5 is a fragmentary sectional view showing a still further modification of the device for carrying out the present invention.

FIG. 5 shows a still further embodiment of the device for carrying out the present invention. In this case, the transparent glass plate 1 is inclined with the upper side of the outer surface located projected beyond the lower side. Since the specific gravity of the fresh water is smaller than that of the sea water thereby giving the tendency that the fresh water supplied at the lower side of the glass plate 1 moves upwardly, the fresh water 10 supplied from the nozzle pipe 2 located at the lower side of the glass plate 1 is urged to positively contact with the outer surface of the glass plate 1 by virtue of the inclination of the glass plate 1 thereby permitting the smell of the fresh water to be more efficiently maintained in the outer surface of the glass plate 1.

The method of the present invention can be applied not only to transparent portions but also to any portions of submarine equipments desired to be applied.

Further, the fresh water can be applied by any means other than that shown in the drawings.

I claim:

1. Method for preventing sea water growth, such as live micro-organisms having aversion to sweet water, from sticking to a submerged outer surface of submarine equipment, such as a submarine house, a tank or an illuminating device for use therewith comprising the steps of:
   providing a flow of fresh water; and
   directing the said flow of fresh water toward the said outer surface of said submarine equipment, which is to be protected from sea-water growth, while submerged beneath the sea water level.

2. Method according to claim 1, wherein the flow of fresh water is supplied continuously.

3. Method according to claim 1, wherein the flow of fresh water is supplied intermittently.

4. Method according to claim 1, wherein the flow of fresh water is supplied from a lower side of said submerged surface, so that an upward flow of the fresh water contacts said submerged surface by virtue of the difference in specific gravity between the fresh water and the sea water.

5. Method according to claim 4, wherein the flow of fresh water is directed toward the said submerged surface, which is inclined with the outer upper side projecting beyond the outer lower side thereby permitting the fresh water to b positively contacted with the sea water side of said submerged surface.

6. Method according to claim 1, wherein the flow of fresh water is forcibly supplied through ejecting holes adjacent either an upper, left or right side of said submerged surface so as to permit the entire area of said submerged surface to be forcibly contacted with the fresh water.

7. Method according to claim 1, wherein the flow of fresh water is supplied to a closed space defined between said submerged surface and a shutter located on the sea water side of said submerged surface capable of being temporarily closed to form said closed space.

8. Method according to claim 1, wherein the flow of fresh water is imparted a sweeping motion by being supplied through a swingable nozzle pipe swingably located on the sea water side of said submerged surface adjacent thereto and having a plurality of ejecting holes through which the fresh water is ejected.

* * * * *